July 23, 1963 L. L. SALTON ETAL 3,098,924

ELECTRICALLY HEATED COVERED WARMING TRAY

Filed June 7, 1961

INVENTORS
LEWIS L. SALTON,
FRED J. BURG
BY KAROL J. MYSELS
AGENT

United States Patent Office 3,098,924
Patented July 23, 1963

3,098,924
ELECTRICALLY HEATED COVERED
WARMING TRAY
Lewis L. Salton, New York, and Fred J. Burg, Bellerose,
N.Y.; said Burg assignor to said Salton
Filed June 7, 1961, Ser. No. 115,560
6 Claims. (Cl. 219—35)

This invention pertains to new and improved heating devices. More specifically it pertains to devices incorporating a heating element, means for supporting various articles or commodities upon this element and a protective dome structure, used in combination with such a heating element.

Generalized language of this type does not adequately completely describe the structures of the present invention or indicate the need for these structures. This invention is best understood by referring to the specific field in which this invention is primarily designed and adapted to be used. This is the field of electrical food warmers. Electrical food warmers may be constructed in a number of different ways. They may be formed as indicated in the Salton Patents No. 2,563,875 and No. 2,976,386 so as to include a glass plate held by a frame. In such structures the glass plate serves to hold a resistance type heating element which during the use of these devices, radiates heat upwardly through the plate so as to cause heating of various foods located upon the plate.

While devices of this type are very satisfactory for their intended purposes nevertheless it has been found that certain disadvantages growing out of their use with food materials occur. As an example of some of these disadvantages reference can be made to the fact that foods located upon heating trays of this type are apt to be unduly dried out as by the escape of moisture. Further, foods located on these trays are exposed to dust, insects or the like and to various ambient conditions which may tend to cause surface cooling.

An object of the present invention is to provide new and improved heating devices which overcome the foregoing and various closely related problems. Another object of this invention is to provide heating devices which may be utilized virtually wherever it is desired to hold materials at an elevated temperature so that such articles are protected from ambient conditions such as dust, insects and the like. A further more specific object of this invention is to provide heating devices as described which may be easily constructed at a comparatively nominal cost, which may be easily assembled together when it is desired to use them, and which are very effective for the purposes intended.

A still more important object of this invention is however to provide heating devices incorporating a heating element and a dome structure utilized in combination with this heating element so as to accomplish the foregoing purposes. In accordance with this invention preferably the dome structure used in this combination is constructed so as to be transparent in order to facilitate and promote the use of the complete combined heating structure of this invention.

Various other objects of this invention, as well as many specific advantages of it will be apparent from a careful consideration of the remainder of this specification, including the appended claims and the accompanying drawing in which:

Figure 1:
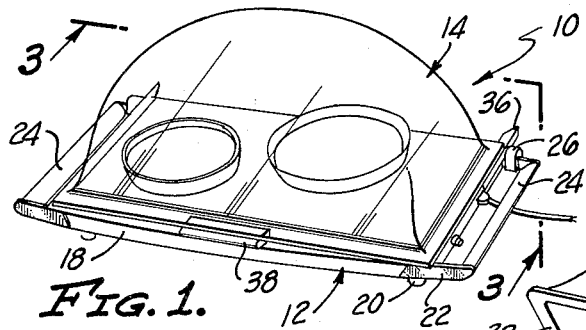
FIG. 1 is a perspective view showing a heating device of the present invention in a closed or operative position.

The accompanying drawing is intended so as to clearly illustrate for explanatory purposes a presently preferred embodiment of this invention. From a consideration of this drawing and the remainder of this specification it will be realized that the features of the present invention defined by the appended claims may be embodied within various other heating devices which differ from the specific device shown as to matters of a routine engineering or design character.

As an aid to understanding this invention it can be stated in essentially summary form that it concerns heating devices which utilize in combination with one another a tray structure having an upper surface capable of emitting heat and a coextensive dome structure having a concave surface disposed towards said tray surface and located upon the tray structure for protecting material supported upon the tray. In accordance with this invention this dome structure is of an imperforate character, and has its marginal edges located adjacent to, but uniformly spaced from, corresponding edges of the tray so as to permit air circulation within the interior of the dome as hereinafter described.

The actual nature of this invention is best more fully explained by referring directly to the drawing. Here there is shown a complete heating device 10 of the present invention which includes a flat, imperforate tray structure 12 used in combination with a comparatively thin, sheet like dome structure 14. This tray structure 12 may be formed in a number of different known manners, although preferably it is formed as indicated in the Salton Patents Nos. 2,563,875 and 2,976,386 so as to include a resistance heating element 15 carried by a glass plate 16 which in turn is enclosed along its margin in and supported by a frame 18. Small legs 20 are normally attached to the frame 18 for the obvious purpose of supporting it. Preferably the tray structure 12 also includes support bars 22 which extend from it and which in turn hold handles 24 used in moving the tray structure 12 from one location to another. Although these support bars 22 may be located in alignment with one another preferably they are curved or otherwise disposed so as not to be aligned with one another as shown for a purpose as hereinafter explained.

Figure 2:
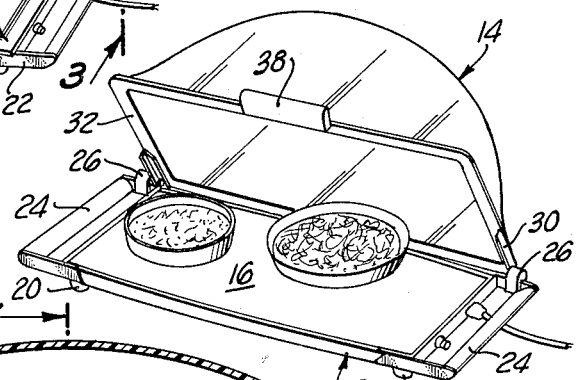
FIG. 2 is a similar perspective view of this heating device in an open or "access" position.
Figure 4:
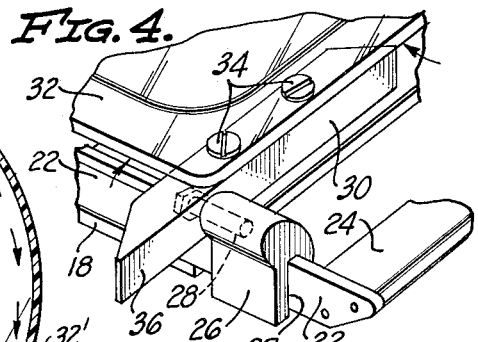
FIG. 4 is an enlarged perspective view showing the construction of a part of the device illustrated in the preceding figures.

The mountings used with the dome structure 14, in the preferred embodiment of this invention illustrated are preferably formed as shown in FIG. 4 of the drawing so as to include bifurcated supports 26 which straddle the support bars 22 on one side of the tray structure 12 at the ends of this tray structure. The slots 27 in these supports 26 are preferably not aligned in order to prevent shifting of the dome structure 14 with respect to the tray structure 12. These support bars 22 carry aligned small pivot pins 28 which in turn engage elongated brackets 30. These brackets 30 are preferably secured to a flat, preferably integral marginal rim 32 which extends completely around the dome structure 14 through the use of screws 34. The rim 32 overlies the frame 18 when the dome structure 14 is in a closed position as shown in FIG. 1. The brackets 30 also extend beyond the rim 32 so as to have ends 36 which are capable of engaging the exterior of the frame 18 so as to support the dome structure 14 in such a manner that the rim 32 extends in a vertical direction as indicated in FIG. 2 when this dome structure 14 is in an open position.

Further, the brackets 30 are formed as shown so as to engage the support bars 22 in order to hold the dome structure 14 in place so that the rim 32 extends in a plane which is generally parallel to the plane of the glass plate 16 when the dome structure 14 is in a closed position as shown in FIG. 1. A projecting handle 38 is attached to the rim 32 so as to extend from it upon the side of the dome structure 14 remote from the brackets 30. This handle 38 is mounted so as to engage the frame 18 when the dome structure 14 is in a closed position as indicated in FIG. 1 of the drawing, and its effective thickness (vertical dimension) corresponds to that of the brackets 30, thus to assist said brackets in maintaining uniform spacing between the dome rim 32 and tray frame 18 throughout their respective full peripheries.

From the foregoing it will be obvious that a concave inner surface 40 of the dome structure 14 overlies the entire plate 16 and that the rim 32 is located so as to generally overlie the frame 18 surrounding this plate 16 and so as to be spaced from it a predetermined comparatively short distance. Because of this type of structure and proper spacing between dome rim and tray frame as aforesaid, during the use of the complete device 10 ambient air from outside of the device 10 tends to be drawn into the interior of this device as illustrated by the arrows in FIG. 3 of the drawing so as to set up an internal air circulation as indicated by these arrows.

From these two figures of the drawing it will be seen that as the tray structure 12 is used for heating purposes that relative cool ambient air will enter the device 10 between the plate 16 and the dome structure 14 and will travel along the surface of the plate 16; during such travel this air tends to be warmed and as a consequence of this it tends to rise within the dome structure 14 toward the surface 40. Heated air rising over the center portion of the plate 16 tends to be cooled by contact with the dome structure 14. The surface 40 tends to direct such air back along to adjacent to the rim 32 where such air passes out of the interior of this device between the rim 32 and the frame 18. Ambient air outside of the device 10 tends to maintain the dome structure 14 sufficiently cool so that it will exercise a cooling function as herein explained.

Figure 3:
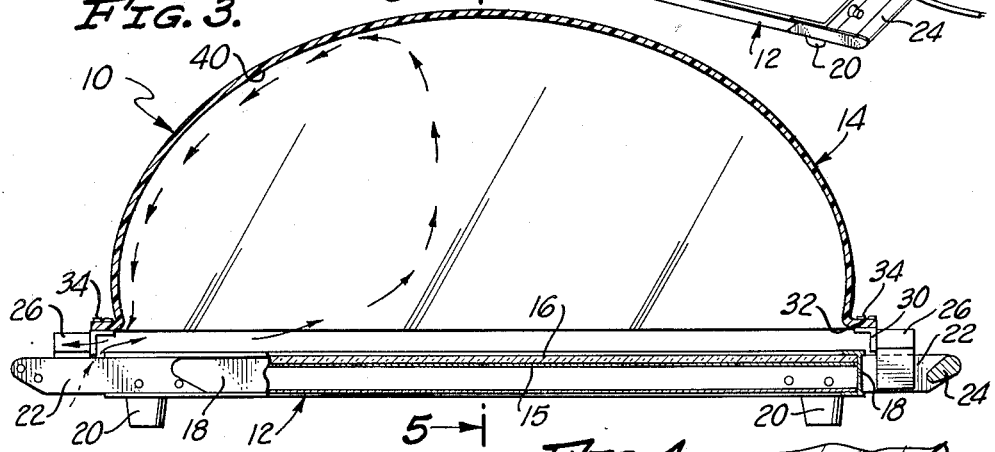
FIG. 3 is a cross-sectional view taken generally at line 3—3 of FIG. 1.

Air flow in the manner indicated by the arrows in FIG. 3 is considered to be quite important in preventing condensation from occurring within the interior of the dome structure 14. Thus, with the present invention an accumulation of the steam or the like is not normally encountered within the interior of this dome structure 14. Hence, moving this dome structure 14 from a closed position shown in FIG. 1 to the open position shown in FIG. 2 does not result in the release of steam or the like. This type of air flow pattern has other consequences which are considered also to be significant. With the type of structure described a constant heated stream of air does not move through the interior of the dome structure 14 and then out through the top of this dome structure, and as a consequence of this the loss of moisture from foods or the like held upon the glass plate 16 is minimized. This result is, however, achieved with sufficient circulation of air so as to prevent "fogging up" of the interior of the dome structure 14.

Such "fogging up" is particularly important or significant when the dome structure 14 is formed out of a transparent material. Preferably in the device 10 the dome structure 14 is formed out of a transparent thermoplastic material such as methyl methacrylate polymer or the like. Any accumulation or condensation of steam or the like within this dome structure 14 would tend to obscure material held upon the plate 16, and, hence, would tend to discourage the use of the complete device 10. It is considered that the use of the entire device 10 is promoted when the dome structure 14 is transparent so that materials upon the plate 16 may be readily viewed.

It is also considered to be significant that the dome structure 14 utilized in the device 10 tends to effectively maintain or "hold" heat within this dome structure 14 between it and glass plate 16. Part of the effectiveness of the dome structure 14 for this purpose is considered to result from the tendency of the concave surface 40 of this dome structure 14 to reflect back toward the glass plate 16 in the device 10 some radiation from the general area of this plate. This result is considered to be significant when it is realized that it is achieved along with transparency of the dome structure 14. Obviously the dome structure 14 will be heated to some extent by radiation from the general area of the plate 16, but it is not heated during the normal operation of the device 10 to a sufficient extent so as to cause its softening in the event that it is formed out of a conventional thermoplastic material.

Figure 5:
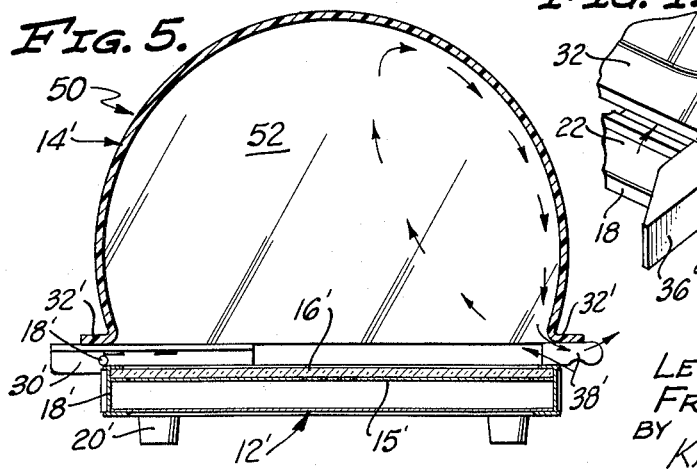
FIG. 5 is a cross-sectional view of a modified heating device of this invention, corresponding to a view taken at line 5—5 of FIG. 3.

If desired, a modified device 50 as shown in FIG. 5 of the drawing may be utilized in order to increase the amount of radiation reflected back toward the heating element in a complete device of this invention. This device 50 is constructed in the same manner as the device 10. For convenience of designation parts of this modified device 50 which correspond to parts of the device 10 are designated herein and in the drawing by the primes of the numerals previously used and are not separately described herein. This modified device 50 includes parts of the device 10 previously described and a reflective surface 52 located upon the interior surface 40' of the dome structure 14'. This coating 52 is preferably of a known type commonly used for so-called "one-way" mirrors or the like, and is designed so that it will not interfere with the transparency of the dome structure 14' when this dome is formed out of a transparent material.

From the foregoing it will be realized that complete devices of this invention, such as the devices 10 and 50 are very efficient for their intended purposes and that these devices may be easily and inexpensively constructed. Because of the nature of this invention it is to be considered as being limited solely by the appended claims forming a part of this specification.

We claim:

1. A heating device which comprises, in combination: an imperforate flat tray structure having an upper surface capable of radiating heat in generally upward direction and means for heating the same; a dome structure coextensive with said tray structure and disposed in covering relation thereon, said dome structure including an imperforate transparent dome having a concave inner surface facing towards said tray surface; and means supporting the dome structure from the tray structure in position such that the lower margin of the dome structure is spaced a predetermined uniform distance above the corresponding margin of the tray structure throughout substantially their respective full peripheries, the spacing between said margins being such as to effect flow of ambient air inwardly to the dome interior, thence upwardly therein, and thence downwardly-outwardly along the inner surface of and finally from the dome as prevents fogging of said dome inner surface.

2. A heating device as defined in claim 1 including a reflective coating located on the surface of said dome structure facing said tray, said tray being visible through said dome structure and said coating.

3. A heating device as defined in claim 1 wherein said supporting means includes hinge means connecting said tray structure and said dome structure so as to permit said dome structure to be swung to an open position with respect to said tray structure.

4. A heating device which includes: a tray structure including a glass plate, a frame holding said glass plate, a resistance heating element located on said glass plate, support bars extending from extremities of said frame and handle means carried by said support bars remote from said frame, said support bars being unaligned with one another; an imperforate dome structure for protecting material supported on said glass plate, said dome structure including bifurcated supports having unaligned slots formed therein engaging said support bars at ends of said frame and at one side of said frame, bracket means pivotally mounted on said supports, a transparent dome having a rim, said rim being attached to said bracket means and extending around the periphery of said plate adjacent to said frame, said dome being transparent and provided with a concave surface facing said glass plate, said surface being reflective and being capable of reflecting said radiation toward said glass plate, and handle means attached to said rim remote from said support means, said handle means engaging said frame so as to space said rim from said frame, said dome structure being capable of being rotated with respect to said tray structure to an open position in which said bracket means engage said frame so as to hold said dome structure spaced from said glass plate.

5. A heating device which comprises, in combination: an imperforate flat tray structure having an upper surface capable of radiating heat in generally upward direction and means for heating the same; a dome structure coextensive with said tray structure and disposed in covering relation thereon, said dome structure including an imperforate transparent dome having a concave inner surface facing towards said tray surface; said tray structure having a marginal frame and said dome structure having a marginal rim; and means interconnecting said tray and dome structures in manner as to provide a predetermined uniform spacing between the frame and the rim thereof through substantially their full peripheries, said spacing being such that ambient air is caused to flow into and from the interior of said dome structure in manner as prevents fogging of the inner surface thereof.

6. A heating device according to claim 1, wherein said last means in part comprises hinge means permitting swinging movement of the dome structure with respect to the tray structure about an axis extending along corresponding sides of the respective structures, and wherein the dome is provided with a handle for imparting such swinging movement to the dome structure, said handle further serving to space said dome and tray structures as aforesaid along their corresponding opposite sides.

References Cited in the file of this patent

UNITED STATES PATENTS

| | | |
|---|---|---|
| 563,430 | Strain | July 7, 1896 |
| 2,243,065 | Barrett | May 27, 1941 |
| 2,558,294 | Finizie | June 26, 1951 |
| 2,563,875 | Salton | Aug. 14, 1951 |
| 2,705,451 | Mueller | Apr. 5, 1955 |
| 2,708,708 | Ronsch | May 17, 1955 |
| 2,848,591 | Taylor | Aug. 19, 1958 |
| 2,976,386 | Salton | Mar. 21, 1961 |
| 3,020,113 | Molitor | Feb. 6, 1962 |
| 3,038,986 | Molitor | June 12, 1962 |

FOREIGN PATENTS

| | | |
|---|---|---|
| 730,959 | Great Britain | June 1, 1955 |